US006918090B2

(12) United States Patent
Hesmer et al.

(10) Patent No.: US 6,918,090 B2
(45) Date of Patent: Jul. 12, 2005

(54) DYNAMIC SETTING OF NAVIGATION ORDER IN AGGREGATED CONTENT

(75) Inventors: Stephan Hesmer, Holzgerlingen (DE); David B. Lection, Raleigh, NC (US); Sha Lu, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 536 days.

(21) Appl. No.: 10/055,472

(22) Filed: Jan. 23, 2002

(65) Prior Publication Data

US 2003/0137538 A1 Jul. 24, 2003

(51) Int. Cl.[7] .................................................. G06F 3/00
(52) U.S. Cl. ........................ 715/760; 715/767; 715/513
(58) Field of Search ......................... 345/760; 707/530; 715/513, 509, 760, 854, 744, 747, 745, 767, 738, 749, 765, 742, 501.1, 530, 514, 515

(56) References Cited

U.S. PATENT DOCUMENTS 6,037,935 A * 3/2000 Bates et al. ................. 345/760
6,622,306 B1 * 9/2003 Kamada ................. 715/760 X
6,675,354 B1 * 1/2004 Claussen et al. ............ 715/513
6,718,515 * 4/2004 Conner et al. ............. 715/509
6,785,865 * 8/2004 Cote et al. .................. 715/513
2001/0021317 * 9/2001 Shimada ...................... 399/82
2001/0053513 * 12/2001 Corn et al. ................. 434/350
2002/0032706 * 3/2002 Perla et al. ................. 707/530

FOREIGN PATENT DOCUMENTS

JP 06-290574 10/1994
JP 10-134549 5/1998
JP 2000-331090 11/2000

* cited by examiner

*Primary Examiner*—Raymond J. Bayerl
(74) *Attorney, Agent, or Firm*—Marcia L. Doubet; Gerald R. Woods

(57) ABSTRACT

Techniques are disclosed for improving navigation through content in a user interface that has been rendered in a content aggregation framework (such as in a portal page provided by a portal system). The navigation order for the aggregated content is set dynamically, using programmatic operations, based on input supplied in a markup language document. The navigation order may therefore be efficiently controlled, even though the content which is aggregated may originate from multiple independent sources.

25 Claims, 29 Drawing Sheets

```
<INPUT TYPE="text" NAME="lastname" SIZE=30
    TABINDEX="<portletAPI:getTabIndexValue region="center:2">" />

<INPUT TYPE="text" NAME="firstname" SIZE=20
    TABINDEX="<portletAPI:getTabIndexValue region="center:1">" />

<INPUT TYPE="text" NAME="address_1" SIZE=35
    TABINDEX="<portletAPI:getTabIndexValue region="center:3">" />
```

```
north="100,199"
south="200,299"
center="300,599"
west="600,799"
east="800,899"
```

```
top="1200,1399"
user="1400,1499"
local="1500,1599"
corporate="1600,1699"
bottom="1700,1999"
```

```
    <!------------------------------------------------------------------------->
    <!--                                                                    -->
    <!-- PortalTopNav.jsp - A JSP used to build the portal magic top -->
    <!--                        navigation area                            -->
    <!--                                                                    -->
    <!------------------------------------------------------------------------->
501 <%@ page contentType="text/html" errorPage="" %>                 503
502 <%@ taglib uri="/WEB-INF/portal/taglibs/portalTags.tld" prefix="ps" %>
    <table BORDER="1" WIDTH="100%" HEIGHT="55">
     <tr>
      <td WIDTH="50%"><img SRC="PortalTopNav.jpg" WIDTH="317" HEIGHT="59"
       ALIGN="BOTTOM" BORDER="0">                   504
      </td>
      <td WIDTH="50%">
       <table BORDER="1" WIDTH="100%">
        <tr>
         <td WIDTH="50%"><b><font FACE="Garamond">Userid</font></b>
         </td>
         <td WIDTH="50%">
          <input TYPE="TEXT" NAME="Field" SIZE="16" MAXLENGTH="8"
      505        TABINDEX="<ps:getTabIndex region="top:1">">
         </td>
                   506           507                 508
        </tr>
        <tr>
         <td WIDTH="50%"><b><font FACE="Garamond">Password</font></b>
         </td>
         <td WIDTH="50%">
          <input TYPE="TEXT" NAME="Field" SIZE="16" MAXLENGTH="8"
      510        TABINDEX="<ps:getTabIndex region="top:2">">
         </td>
                   511           512                 513
        </tr>
       </table>
      </td>
     </tr>
    </table>
```

```
    <!---------------------------------------------------------------------->
    <!--                                                                 -->
    <!-- PortalLeftNav.jsp - A JSP used to build the portal magic left -->
    <!--                        navigation area                           -->
    <!--                                                                 -->
    <!---------------------------------------------------------------------->
    <%@ page contentType="text/html" errorPage="" %>
521 <%@ taglib uri="/WEB-INF/portal/taglibs/portalTags.tld" prefix="ps" %>
    <!- EXAMPLE  src='<wps:url type="base"/>images/themes/title_minheight.gif'> -->
522 <table BORDER="1" WIDTH="100%" HEIGHT="408">
523  <tr>                                   524
      <td WIDTH="100%" HEIGHT="20"><a HREF="portalmagic.com/main"
         TABINDEX="<ps:getTabIndex region="left">">Main</a>
      </td>     525                          526
     </tr>
527  <tr>
      <td WIDTH="100%" HEIGHT="20"><a HREF="portalmagic.com/movies"
         TABINDEX="<ps:getTabIndex region="left">">Movies</a>
      </td>
     </tr>
528  <tr>
      <td WIDTH="100%" HEIGHT="20"><a HREF="portalmagic.com/news"
         TABINDEX="<ps:getTabIndex region="left">">News</a>
      </td>
     </tr>
529  <tr>
      <td WIDTH="100%" HEIGHT="20"><a HREF="portalmagic.com/Corporate"
         TABINDEX="<ps:getTabIndex region="left">">Corporate</a>
      </td>
     </tr>
530  <tr>
      <td WIDTH="100%" HEIGHT="28"> 
      </td>
     </tr>
    </table>
```

```
<!------------------------------------------------------------------>
<!--                                                            -->
<!-- StockPortlet.jsp - A JSP used to build the Stock Portlet -->
<!--                     Display area                           -->
<!--                                                            -->
<!------------------------------------------------------------------>
<%@ page contentType="text/html" errorPage="" %>
<%@ taglib uri="/WEB-INF/portal/taglibs/portalTags.tld" prefix="ps" %>
<table BORDER="1" WIDTH="103%" HEIGHT="370">
 <tr>
  <td WIDTH="100%" HEIGHT="189" VALIGN="TOP">
   <table BORDER="1" WIDTH="100%" HEIGHT="108">
    <tr>
     <td WIDTH="50%" HEIGHT="20">IBM</td>
     <td WIDTH="50%" HEIGHT="20">116 5/8</td>
    </tr>
    <tr>
     <td WIDTH="50%" HEIGHT="20">MSFT</td>
     <td WIDTH="50%" HEIGHT="20">69 7/8</td>
    </tr>
    <tr>
     <td WIDTH="50%" HEIGHT="20">CSCO</td>
     <td WIDTH="50%" HEIGHT="20">19 3/4</td>
    </tr>
    <tr>
     <td WIDTH="50%" HEIGHT="20">IBI</td>
     <td WIDTH="50%" HEIGHT="20">32 27/64</td>
    </tr>
   </table>
  </td>
 </tr>
```

FIG. 5C2

```
     <tr>
      <td WIDTH="100%" VALIGN="TOP"><br>
       <br>
       Enter A Stock Symbol<br>
       <br>
541    <input TYPE="TEXT" NAME="Field2" SIZE="12"
             TABINDEX="<ps:getTabIndex region="StockPortlet:1">">     <br>
       <br>
542    <input TYPE="SUBMIT" NAME="Submit2" VALUE="GetQuote"
             TABINDEX="<ps:getTabIndex region="StockPortlet:2">">    </td>
     </tr>
    </table>
```

```
<!-------------------------------------------------------------------->
<!--                                                                -->
<!-- WeatherPortlet.jsp - A JSP used to build the Weather Portlet -->
<!--                        Display area                            -->
<!--                                                                -->
<!-------------------------------------------------------------------->
<%@ page contentType="text/html" errorPage="" %>
551 <%@ taglib uri="/WEB-INF/portal/taglibs/portalTags.tld" prefix="ps" %>
<table BORDER="1" WIDTH="100%" HEIGHT="413">
 <tr>
  <td WIDTH="100%" HEIGHT="20">
     <img SRC="PortletTitleBar2.jpg" WIDTH="160" HEIGHT="20"
      ALIGN="BOTTOM" BORDER="0">
  </td>
 </tr>
 <tr>
  <td WIDTH="100%" VALIGN="TOP" BGCOLOR="#FFFBF0"> <br>
   <br>
   <font SIZE="2">City: </font>Raleigh, NC<font SIZE="2"> <br>
   <br>
   Today:  </font>Cloudy High 78<font SIZE="2"> <br>
   <br>
   Tonight: </font>Rain Low 50's<font SIZE="2"> <br>
   <br>
   Tomorrow: </font>Sunny High 82 <br>
   <br>
   Enter a city for another weather forecast: <br>
   <br>
552 <input TYPE="TEXT" NAME="Field1" SIZE="17" MAXLENGTH="25"
         TABINDEX="<ps:getTabIndex region="WeatherPortlet:1">"> <br>
553 <input TYPE="SUBMIT" NAME="Get Weather" VALUE="Get Weather"
         TABINDEX="<ps:getTabIndex region="WeatherPortlet:2">">
  </td>
 </tr>
</table>
```

```
<!------------------------------------------------------------------------>
<!--                                                                  -->
<!-- ChatPortlet.jsp - A JSP used to build the Chat Portlet  -->
<!--                        Display area                              -->
<!--                                                                  -->
<!------------------------------------------------------------------------>
<%@ page contentType="text/html" errorPage="" %>
<%@ taglib uri="/WEB-INF/portal/taglibs/portalTags.tld" prefix="ps" %>
<table BORDER="1" WIDTH="100%" BGCOLOR="white">
 <tr>
  <td WIDTH="100%" HEIGHT="153" VALIGN="TOP">
561  <textarea rows="8" cols="16"
       TABINDEX="<ps:getTabIndex region=
          "ChatPortlet">"><Joe>Hi David!</textarea>
  </td>
 </tr>
 <tr>
  <td WIDTH="100%" HEIGHT="193">
   <table BORDER="0" WIDTH="100%" HEIGHT="180" BGCOLOR="#FFFBF0">
    <tr>
     <td WIDTH="100%" HEIGHT="140" VALIGN="TOP" BGCOLOR="white">
  562  <textarea rows="8" cols="16"
          TABINDEX="<ps:getTabIndex region=
             "ChatPortlet">">Hello Joe!</textarea>   </td>
    </tr>
    <tr>
     <td WIDTH="100%" BGCOLOR="#F3F3F3">
  563  <input TYPE="SUBMIT" NAME="Submit" VALUE="Send"
             TABINDEX="<ps:getTabIndex region="ChatPortlet">">
     </td>          \ 564
    </tr>
   </table>
  </td>
 </tr>
</table>
```

```
<!-------------------------------------------------------------------->
<!--                                                                -->
<!-- PortalBottomNav.jsp - A JSP used to build the portal magic bottom -->
<!--                       navigation area                          -->
<!--                                                                -->
<!-------------------------------------------------------------------->
<%@ page contentType="text/html" errorPage="" %>
<%@ taglib uri="/WEB-INF/portal/taglibs/portalTags.tld" prefix="ps" %>
571 <table  BORDER="1" WIDTH="733" HEIGHT="55" BGCOLOR="#FFFBF0">
  <tr>
    <td WIDTH="100%" HEIGHT="50" BGCOLOR="#FFFBF0">
  572 <img SRC="PortalBotNav.jpg" WIDTH="640" HEIGHT="60"
          ALIGN="BOTTOM" BORDER="0">
    </td>
  </tr>
</table>
```

```
<!doctype HTML PUBLIC "-//W3C//DTD HTML 3.2//EN">
<html>

<head>
 <meta HTTP-EQUIV="Content-Type" CONTENT="text/html;CHARSET=iso-8859-1">
 <title>RSW9-2001-0172 Portal Magic</title>
</head>

<body>

<form ACTION="default.cgi" METHOD="POST"
      ENCTYPE="application/x-www-form-urlencoded"> <p>
 <table BORDER="0" WIDTH="733" HEIGHT="480" BGCOLOR="#FFFBF0"> <tr>
   <td WIDTH="100%" HEIGHT="60" BGCOLOR="#CCFFFF">
    <table BORDER="1" WIDTH="100%" HEIGHT="55">
     <tr>
      <td WIDTH="50%"><img SRC="PortalTopNav.jpg" WIDTH="317"
          HEIGHT="59" ALIGN="BOTTOM" BORDER="0"></td> <td WIDTH="50%">
       <table BORDER="1" WIDTH="100%">
        <tr>
          <td WIDTH="50%"><b><font FACE="Garamond">Userid</font></b></td>
          <td WIDTH="50%">
    581 <input TYPE="TEXT" NAME="Field" SIZE="16" MAXLENGTH="8" TABINDEX="1001">
          </td>                                                     582
        </tr>
        <tr>
          <td WIDTH="50%"><b><font FACE="Garamond">Password</font></b></td>
          <td WIDTH="50%">
    583 <input TYPE="TEXT" NAME="Field" SIZE="16" MAXLENGTH="8" TABINDEX="1002">
          </td>                                                     584
        </tr>
       </table>
      </td>
     </tr>
    </table>
   </td>
  </tr>
```

FIG. 5G2

```
<tr>
 <td WIDTH="100%" HEIGHT="437">
  <table BORDER="1" WIDTH="100%" HEIGHT="380" BGCOLOR="#CCCCFF">
   <tr>
    <td WIDTH="16%" BGCOLOR="white">
     <table BORDER="1" WIDTH="100%" HEIGHT="408">
      <tr>
585     <td WIDTH="100%" HEIGHT="20">
          <a HREF="portalmagic.com/main" TABINDEX="201">Main</a>
        </td>
      </tr>
      <tr>
586     <td WIDTH="100%" HEIGHT="20">
          <a HREF="portalmagic.com/movies" TABINDEX="202">Movies</a>
        </td>
      </tr>
      <tr>
587     <td WIDTH="100%" HEIGHT="20">
          <a HREF="portalmagic.com/news" TABINDEX="203">News</a>
        </td>
      </tr>
      <tr>
588     <td WIDTH="100%" HEIGHT="20">
          <a HREF="portalmagic.com/Corporate" TABINDEX="204">Corporate</a>
        </td>
      </tr>
      <tr>
        <td WIDTH="100%" HEIGHT="28"> 
        </td>
      </tr>
     </table>
    </td>
```

FIG. 5G3

```
<td WIDTH="29%" BGCOLOR="#FFFBF0">
 <table BORDER="1" CELLSPACING="1" WIDTH="89%" HEIGHT="410">
  <tr>
    <td WIDTH="177" HEIGHT="20">
     <img SRC="PortletTitleBar1.jpg" WIDTH="160"
        HEIGHT="20" ALIGN="BOTTOM" BORDER="0">
    </td>
  </tr>
  <tr>
    <td WIDTH="177">
     <table BORDER="1" WIDTH="103%" HEIGHT="370">
      <tr>
        <td WIDTH="100%" HEIGHT="189" VALIGN="TOP">
          <table BORDER="1" WIDTH="100%" HEIGHT="108">
           <tr>
             <td WIDTH="50%" HEIGHT="20">IBM</td>
             <td WIDTH="50%" HEIGHT="20">116 5/8</td>
           </tr>
           <tr>
             <td WIDTH="50%" HEIGHT="20">MSFT</td>
             <td WIDTH="50%" HEIGHT="20">69 7/8</td>
           </tr>
           <tr>
             <td WIDTH="50%" HEIGHT="20">CSCO</td>
             <td WIDTH="50%" HEIGHT="20">19 3/4</td>
           </tr>
           <tr>
             <td WIDTH="50%" HEIGHT="20">IBI</td>
             <td WIDTH="50%" HEIGHT="20">32 27/64</td>
           </tr>
          </table>
        </td>
      </tr>
```

FIG. 5G4

```
      <tr>
       <td WIDTH="100%" VALIGN="TOP"><br> br>
        Enter A Stock Symbol<br>
        <br>
  589   <input TYPE="TEXT" NAME="Field2" SIZE="12" TABINDEX="51"> <br>
        <br>
  590   <input TYPE="SUBMIT" NAME="Submit2" VALUE="Get Quote" TABINDEX="52">
       </td>
      </tr>
     </table>
    </td>
   </tr>
  </table>
 </td>
 <td WIDTH="26%" BGCOLOR="white">
  <table BORDER="1" WIDTH="100%" HEIGHT="413">
   <tr>
    <td WIDTH="100%" HEIGHT="20">
      <img SRC="PortletTitleBar2.jpg" WIDTH="160"
          HEIGHT="20" ALIGN="BOTTOM" BORDER="0">
    </td>
   </tr>
   <tr>
    <td WIDTH="100%" VALIGN="TOP" BGCOLOR="#FFFBF0"><br>   <br>
     <font SIZE="2">City: </font>Raleigh, NC<font SIZE="2"><br>   <br>
     Today:  </font>Cloudy High 78<font SIZE="2"><br>    <br>
     Tonight: </font>Rain Low 50's<font SIZE="2"><br>    <br>
     Tomorrow: </font>Sunny High 82<br>
     <br>
     Enter a city for another weather forecast:<br>    <br>
591  <input TYPE="TEXT" NAME="Field1" SIZE="17"
          MAXLENGTH="25" TABINDEX="101">  <br>
592  <input TYPE="SUBMIT" NAME="Get Weather"
          VALUE="Get Weather" TABINDEX="102">
    </td>
   </tr>
  </table>
 </td>
```

FIG. 5G5

```
<td WIDTH="29%" BGCOLOR="#FFFBF0">
 <table BORDER="1" WIDTH="100%" HEIGHT="412">
  <tr>
    <td WIDTH="100%" HEIGHT="20">
       <img SRC="PortletTitleBar3.jpg" WIDTH="160"
              HEIGHT="20" ALIGN="BOTTOM" BORDER="0">
    </td>
  </tr>
  <tr>
    <td WIDTH="100%">
     <table BORDER="1" WIDTH="100%" BGCOLOR="white">
      <tr>
       <td WIDTH="100%" HEIGHT="153" VALIGN="TOP">
593    <textarea rows="8" cols="16" TABINDEX="151"><Joe>Hi David!</textarea>
       </td>
      </tr>
      <tr>
       <td WIDTH="100%" HEIGHT="193">
        <table BORDER="0" WIDTH="100%" HEIGHT="180"
               BGCOLOR="#FFFBF0">
         <tr>
          <td WIDTH="100%" HEIGHT="140" VALIGN="TOP"
               BGCOLOR="white">
      594 <textarea rows="8" cols="16"
                 TABINDEX="152">Hello Joe!</textarea>
          </td>
         </tr>
         <tr>
          <td WIDTH="100%" BGCOLOR="#F3F3F3">
     595 <input TYPE="SUBMIT" NAME="Submit"
                   VALUE="Send" TABINDEX="153">
          </td>
         </tr>
        </table>
```

FIG. 5G6

```
                </td>
              </tr>
            </table>
          </td>
        </tr>
      </table>
    </td>
  </tr>
  </table>
  </td>
  </tr>
  <tr>
596 <table  BORDER="1" WIDTH="733" HEIGHT="55" BGCOLOR="#FFFBF0">
      <tr>
       <td WIDTH="100%" HEIGHT="50" BGCOLOR="#FFFBF0">
          <img SRC="PortalBotNav.jpg" WIDTH="640"
                HEIGHT="60" ALIGN="BOTTOM" BORDER="0">
       </td>
      </tr>
    </table>
  </tr>
 </table>

</form>

</body>

</html>
```

```
<?xml version="1.0"?>
<market-data>
  <quote-set>
    <quote symbol="IBM" name="IBM" type="stock" exchange-code="NYSE"
     last="93.187500" close="94.625000" close-flag="open" change="-1.4375"
     percent-change="-1.52%" hyperfeed-time="16:02" time="2001-01-04T18:50:10"
     volume="15420600" open="94.75" high="99.75" low="92.6875" bid="0.0" ask="0.0"
     bid-size="0" ask-size="0" high-52-week="134.938" low-52-week="86.937996"
     dividend-value="n.a." dividend-frequency="Quarterly" dividend-date="11/08/00"
     shares-outstanding="1760700" pe-ratio="22.709999" volatility="12.290000"
     yield="0.550000" earnings-per-share="4.102000" status="ok"/>
    <quote symbol="SUNW" name="SUN MICROSYSTEMS  INC." type="stock"
     exchange-code="NASDAQ" last="31.000000" close="33.000000" close-flag="closed"
     change="-2.0" percent-change="-6.06%" hyperfeed-time="16:01"
     time="2001-01-04T18:50:10" volume="65153900" open="32.25" high="34.0"
     low="29.75" bid="30.9375" ask="31.0" bid-size="8" ask-size="1"
     high-52-week="129.313" low-52-week="57.375" dividend-value="n.a."
     dividend-frequency="not avail." dividend-date="00/00/00"
     shares-outstanding="1609456" pe-ratio="25.239999" volatility="13.800000"
     yield="0.000000" earnings-per-share="1.228000" status="ok"/>
    <quote symbol="SCRM" name="SCREAMINGMEDIA INC." type="stock"
     exchange-code="NASDAQ" last="3.000000" close="3.125000" close-flag="open"
     change="-0.125" percent-change="-4.0%" hyperfeed-time="15:40"
     time="2001-01-04T18:50:10" volume="13200" open="3.0" high="3.3125" low="2.875"
     bid="3.0" ask="3.0625" bid-size="10" ask-size="1" high-52-week="15.75"
     low-52-week="4.25" dividend-value="n.a." dividend-frequency="not avail."
     dividend-date="00/00/00" shares-outstanding="37425" pe-ratio="-0.660000"
     volatility="0.000000" yield="0.000000" earnings-per-share="-4.511000" status="ok"/>
  </quote-set>
</market-data>
```

```
<?xml version="1.0"?>
<xsl:stylesheet xmlns:xsl = "http://www.w3.org/1999/XSL/Transform" version = "1.0"
            extension-element-prefixes="ps">
  <xsl:output indent="yes" method="html"omit-xml-declaration="yes"/>
   <xsl:template match="/market-data">
     <p class="wpsPortletHead">Stock quote with static sample data:</p>
     <table border="1" >
     <tr class="wpsPortletHead" align="center">
          <td>Symbol</td>
          <td colspan="2">Last Trade</td>
          <td colspan="2">Change</td>
          <td>Volume</td>
          <td>Open</td>
          <td>Day's Range</td>
     </tr>
     <xsl:apply-templates />
     </table>

     <form method="get" action="http://hotquotes.com">
          <input type="text" name="stock">
          <xsl:attribute name="TABINDEX">
          <xsl:value-of select="ps:getTabIndex('StockPortlet',1)"/></xsl:attribute>
          </input>
          <input type="submit" value="Get Quote">
          <xsl:attribute name="TABINDEX">
          <xsl:value-of select="ps:getTabIndex('StockPortlet',2)"/></xsl:attribute>
          </input>
     </form>
   </xsl:template>
```

```xml
<xsl:template match="quote-set/quote">
    <tr class="wpsPortletText" align="center" nowrap="nowrap">
    <td nowrap="nowrap">
        <xsl:value-of select="@symbol"/>
    </td>
    <td nowrap="nowrap">
        <xsl:value-of select="@hyperfeed-time"/>
    </td>
    <td nowrap="nowrap">
        <xsl:value-of select="format-number(@last, '0.##')"/>
    </td>
    <td nowrap="nowrap">
        <xsl:value-of select="format-number(@change, '0.##')"/>
    </td>
    <td nowrap="nowrap">
        <xsl:value-of select="@percent-change"/>
    </td>
    <td nowrap="nowrap">
        <xsl:value-of select="format-number(@volume, '#,###,###')"/>
    </td>
    <td nowrap="nowrap">
        <xsl:value-of select="format-number(@open, '0.##')"/>
    </td>
    <td nowrap="nowrap">
        <xsl:value-of select="format-number(@low, '0.##')"/>
        <xsl:text> - </xsl:text>
        <xsl:value-of select="format-number(@high, '0.##')"/>
    </td>
    </tr>
</xsl:template>

</xsl:stylesheet>
```

```
<p class="wpsPortletHead">Stock quote with static sample data:</p>
 <table border="1" >
  <tr class="wpsPortletHead" align="center">
  <td>Symbol</td>
  <td colspan="2">Last Trade</td>
  <td colspan="2">Change</td>
  <td>Volume</td>
  <td>Open</td
  ><td>Day's Range</td>
  </tr>

  <tr class="wpsPortletText" align="center" nowrap="nowrap">
  <td nowrap="nowrap">IBM</td>
  <td nowrap="nowrap">16:02</td>
  <td nowrap="nowrap">93.19</td>
  <td nowrap="nowrap">-1.44</td>
  <td nowrap="nowrap">-1.52%</td>
  <td nowrap="nowrap">15,420,600</td>
  <td nowrap="nowrap">94.75</td>
  <td nowrap="nowrap">92.69 - 99.75</td>
  </tr>
```

```
<tr class="wpsPortletText" align="center" nowrap="nowrap">
<td nowrap="nowrap">SUNW</td>
<td nowrap="nowrap">16:01</td>
<td nowrap="nowrap">31.00</td>
<td nowrap="nowrap">-2.00</td>
<td nowrap="nowrap">-6.06%</td>
<td nowrap="nowrap">65,153,900</td>
<td nowrap="nowrap">32.25</td>
<td nowrap="nowrap">29.75 - 34.00</td>
</tr>

<tr class="wpsPortletText" align="center" nowrap="nowrap">
<td nowrap="nowrap">SCRM</td>
<td nowrap="nowrap">15:40</td>
<td nowrap="nowrap">3.00</td>
<td nowrap="nowrap">-0.13</td>
<td nowrap="nowrap">-4.00%</td>
<td nowrap="nowrap">13,200</td>
<td nowrap="nowrap">3.00</td>
<td nowrap="nowrap">2.88 - 3.31</td>
</tr>

</table>
                                                                681
    ⎡<form method="get" action="http://hotquotes.com">
680│   <input type="text" name="stock" TABINDEX="101" />
   ⎨   <input type="submit" value="Get Quote" TABINDEX="102" />
    ⎣</form>
                                                                682
```

690

Stock quote with static sample data:

| Symbol | Last Trade | | Change | | Volume | Open | Day's Range |
|---|---|---|---|---|---|---|---|
| IBM | 16:02 | 93.19 | -1.44 | -1.52% | 15,420,600 | 94.75 | 92.69 - 99.75 |
| SUNW | 16:01 | 31.00 | -2.00 | -6.06% | 65,153,900 | 32.25 | 29.75 - 34.00 |
| SCRM | 15:40 | 3.00 | -0.13 | -4.00% | 13,200 | 3.00 | 2.88 - 3.31 |

700

DYNAMIC SETTING OF NAVIGATION ORDER IN AGGREGATED CONTENT

BACKGROUND OF THE INVENTION

1. Field of the Invention

The present invention relates to computer software, and deals more particularly with improved navigation of content in a user interface that has been rendered in a content aggregation framework (such as in a portal page provided by a portal system).

2. Description of the Related Art

The popularity of distributed computing networks and network computing has increased tremendously in recent years, due in large part to growing business and consumer use of the public Internet and the subset thereof known as the "World Wide Web" (or simply "Web"). Other types of distributed computing networks, such as corporate intranets and extranets, are also increasingly popular. As solutions providers focus on delivering improved Web-based computing, many of the solutions which are developed are adaptable to other distributed computing environments. Thus, references herein to the Internet and Web are for purposes of illustration and not of limitation.

The early Internet served primarily as a distributed file system in which users could request delivery of already-generated static documents. In recent years, the trend has been to add more and more dynamic and personalized aspects into the content that is served to requesters. One area where this trend is evident is in the increasing popularity of content frameworks such as those commonly referred to as "portals" (or, equivalently, portal systems or portal servers). A portal is a type of content framework that serves as a gateway, or focal point, for users to access an aggregation or collection of content from multiple independent sources. A portal provides its users with a user interface structured as a Web page. This Web page is known as a "portal page", and is normally structured as a single overview-style page (which may provide links for the user to navigate to more detailed information). Alternatively, portal pages may be designed using a notebook paradigm whereby multiple pages are available to the user upon selecting a tab for that page. Some experts predict that portal pages wall become the computing "desktop" view of the future. (While discussions herein are primarily in terms of portals, portal pages, and portlets, this is for purposes of illustration only. Other content aggregation frameworks providing similar functionality may be substituted without deviating from the scope of the present invention.)

Portal pages offer users Web pages that contain content from many different sources, and provide rich content to users in a compact form. Sources of portal page content include Internet sites, a company's intranet, news groups, applications, and other content management feeds. Many portals allow users to design a personalized version of the portal page, whereby the user can tailor the content, the layout, and/or the presentation attributes (such as color, font, etc.) of the page to his or her own preferences.

Portals are commonly designed using a component model that allows plugging components referred to as "portlets" (or, alternatively, components using a similar abstraction) into the portal infrastructure. Each portlet is responsible for obtaining a portion of the content that is to be rendered as part of the complete portal page for the user.

A portal operates as a Web application, and the portlets serve as application interfaces to their respective function. During operation, the portal calls the portlets, which return markup language (such as Hypertext Markup Language, or "HTML") syntax to the portal. By convention, the portlet is invoked through its "service" method. The markup stream returned from this invocation encapsulates the result of the portlet's execution. The portal's content aggregation process aggregates the markup streams from the invoked portlets into a single stream of markup, and returns this stream as a page for rendering with the user's browser (or other user agent). Once the content created by the portlets has been aggregated with other markup language syntax, the result is a Web page whose content is well suited for the needs of the portal page's human user.

FIG. 1 provides an example of a portal page 100 which includes three portlets 120, 130, 140. Portlet 120 in this example displays news headlines. Portlet 130 shows stock information for the user's favorite stocks, and portlet 140 displays the current weather and weather forecast for the user's selected city.

Actual portal pages may be much more rich in content than the example in FIG. 1. A portal page may also contain navigation areas within the page. In the portal page 100, the topmost graphic 110 which displays a portal logo 111 is a navigation bar which includes links 112, 113, 114 to other portal functions.

Portals are typically viewed with "north", "south", "east", and "west" navigation areas. The center area of the page is then reserved for the aggregation of portlet content. The majority of portals offer only north and south navigation areas. Other portals, such as the WebSphere® Portal Server from the International Business Machines Corporation ("IBM®"), offer just a north navigation area. ("WebSphere" and "IBM" are registered trademarks of the International Business Machines Corporation.) The remainder of the view may then be used for portlet content. Still other portals provide navigation areas designated as "top" and "left" (which are analogous to the north and west navigation areas of other portals). In general, any combination of navigation areas and content area may be supported, with the visual appearance and functional content of a particular portal page determining how many navigation areas there are, and what their placement should be.

When content on the portal page includes elements that can receive the focus, such as input fields and links, the declaration order of these elements determines the order in which the elements will be visited when the user navigates the page using the tab key. This order can be overridden by assigning the elements a numeric visitation order, which is specified as the value of a TABINDEX attribute within the markup language syntax from which the page is rendered. When the TABINDEX attribute is used, the tab order will be determined by these values for each element, independent of the actual position of the field or link within the rendered page.

A problem therefore arises. An individual portlet's output markup stream may specify TABINDEX values without regard to this output stream being aggregated with other portlet content (i.e. with other output streams), where that other portlet content may also contain its own TABINDEX specifications. Navigation areas may also contain TABINDEX specifications. Since each portlet and navigation area is an independent entity, and the portlets and navigation areas making up a particular portal page may therefore originate from multiple sources, there is no coordination among the TABINDEX settings that may be specified. If pressing the tab key causes the current cursor position (or the window focus) to move in an apparently erratic manner (jumping unexpectedly from one navigation bar to another or jumping across a portlet's entire output area, for example), the human user may become confused or irritated, and the user's productivity may suffer as he or she attempts to work with the portal page.

One way to address this problem might be for the portal aggregation process that is assembling the portal page to scan all of the page content (i.e. the aggregation of markup streams) and insert sequentially-ordered TABINDEX attribute values into each link or form field tag (as well as into other tags that may receive the focus). However, scanning each generated portal page in this manner would be very expensive in terms of computational overhead at the portal, lowering server performance and likely causing a severe processing bottleneck. Thus, this is not a viable solution.

Accordingly, what is needed is a way to improve navigation of content that has been rendered in a content aggregation framework.

SUMMARY OF THE INVENTION

An object of the present invention is to provide improved navigation of content in a user interface that has been rendered in a content aggregation framework (such as in a portal page provided by a portal system).

Another object of the present invention is to provide techniques for dynamically setting the navigation order in aggregated content.

A further object of the present invention is to efficiently control the navigation order within dynamically aggregated content.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for improving navigation of content in a user interface that has been rendered in a content aggregation framework. In one aspect, this technique comprises: detecting, on a navigable element of an input document encoded in a markup language, an indication that a navigation stop should occur at this element in a determined navigation order; programmatically determining, responsive to detecting the indication, the navigation order in which the navigation stop at the element should occur; and programmatically modifying the navigable element from the input document to specify the programmatically determined navigation order. The detecting, programmatically determining, and programmatically modifying may operate on indications of more than one navigable element in the input document.

The technique may further comprise rendering an output document which results from the programmatic modification(s), wherein the rendered output document is navigable in the programmatically determined navigation order.

The technique preferably further comprises aggregating a plurality of input documents encoded in the markup language, thereby creating an aggregated document, wherein more than one of the input documents specifies navigation stops on navigable elements, and wherein the programmatic determination and programmatic modifications are performed for each of the input documents during the aggregation. This aggregated document is then preferably rendered, wherein the rendered aggregated document in navigable in the programmatically determined navigation order.

The markup language may be, for example, HTML or XML ("Extensible Markup Language"). The input document may be a JavaServer Page specification, in which case the programmatic modifications preferably modify a document created by programmatically evaluating the JavaServer Page specification. Or, the input document may be a portlet specification, in which case the programmatic modifications preferably modify a document created by programmatically evaluating the portlet specification. Or, the programmatic modifications may further comprise evaluating the input document according to a style sheet. In this latter case, the style sheet may be encoded in XSL ("Extensible Stylesheet Language").

Preferably, the indication comprises a reference to executable code and supplies an identification of a region into which the navigable element is to be rendered. Optionally, the indication may further comprise an offset value within the region. The indication may be specified as a value of a TABINDEX attribute. When the indication comprises a reference to executable code and supplies an identification of the region, the programmatic modification preferably comprises replacing the reference and region identification with a numeric value that specifies the programmatically determined navigation order. When the indication also includes an offset, the programmatic modification preferably comprises replacing the reference, region identification, and offset with a numeric value that specifies the programmatically determined navigation order.

The present invention may also be used advantageously in methods of doing business, for example by providing improved portal systems and/or services wherein the navigation of content with such systems/services occurs in an improved manner. Providers of such systems and services may offer their content-provider clients some assurances of improved content navigation, such that the content providers can expect improved end-user viewing experiences. Other methods of doing business in an improved manner may also be provided, once the inventive concepts disclosed herein are known.

The present invention will now be described with reference to the following drawings, in which like reference numbers denote the same element throughout.

BRIEF DESCRIPTION OF THE DRAWINGS

FIGS. 3A–3C are used to illustrate an example of syntax that may be used in markup language documents processed according to a first preferred embodiment of the present invention;

FIGS. 4A and 4B illustrate specifying tab index range values in a configuration file or properties file, for use by preferred embodiments of the present invention;

FIGS. 5A–5F illustrate sample input documents used to create a portal page with dynamically-assigned navigation ordering, and FIG. 5G (comprising FIGS. 5G1–5G6) shows how these input documents are aggregated into a single composite output document containing the assigned navigation ordering, according to the first preferred embodiment of the present invention;

FIGS. 6A–6C illustrate sample input documents used to create a portal page with dynamically-assigned navigation ordering.

DESCRIPTION OF PREFERRED EMBODIMENTS

Figure 1:
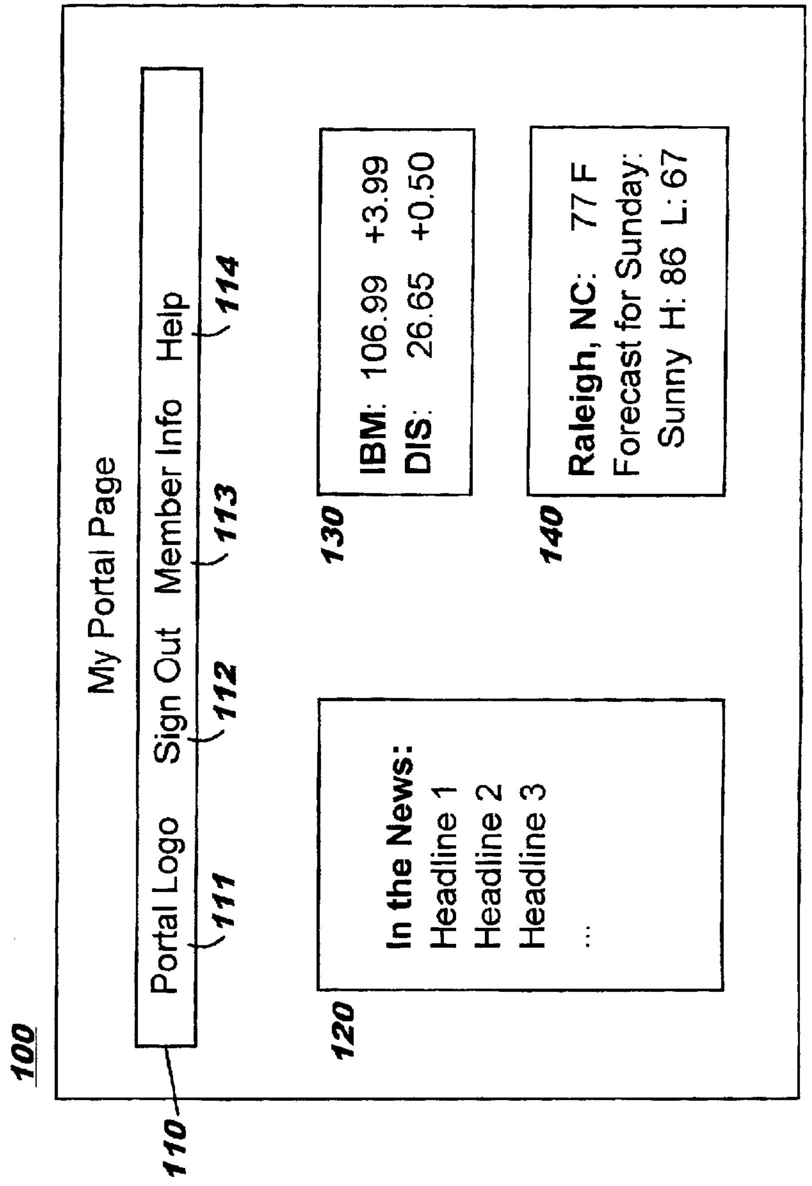
FIG. 1 illustrates a portal page which aggregates content from three portlets, according to the prior art.

The present invention provides improved techniques for navigating content which is rendered in a content aggregation framework. For purposes of illustration but not of limitation, the content aggregation framework is described herein as a portal, and the components that plug into this framework for providing dynamic content are described as portlets. A plurality of embodiments are disclosed for dynamically and programmatically assigning a visitation order to any "tab-able" (or "navigable") fields on a portal page (that is, the fields or elements which can receive the focus), such that the resulting tab indexes are uniform, consistent, and provide for tab-based visitation to occur in a logical order. The visitation order may apply to navigation areas within a portal page, as well as to content areas within the page. Use of the present invention enables navigating the aggregated content that is rendered with a user's browser (or other user agent, equivalently) in a more intuitive manner, thereby increasing ease of use and user satisfaction with the content (and with the underlying portal as well).

The improved navigation (referred to equivalently herein as "visitation order" or "visitation ordering") which is made possible by the present invention provides a number of advantages over the prior art. In the prior art, individual components may assign their own TABINDEX values but have no way of providing a coordinated ordering among multiple independently-developed components. A result of the prior art approach is that a very random-seeming visitation order may be offered to users. (Furthermore, non-unique TABINDEX values may occur when using the prior art approach, which is generally undesirable.)

The HTML 4.01 specification, where the TABINDEX attribute is defined, prescribes rules for how a user agent should navigate through the set of elements that may receive the focus. (The elements which may receive focus are the tab-able elements, as stated above.) First, the elements that assign a positive value to TABINDEX are navigated first, starting with the lowest tab index value and proceeding toward the highest value. If a tab index value is duplicated, then the order of navigation is the order in which the element is encountered in the markup stream. Next, elements that do not assign a tab index value are navigated, in the order in which those elements are encountered in the markup stream. Elements supporting the TABINDEX attribute are: A, AREA, BUTTON, INPUT, OBJECT, SELECT, and TEXTAREA. (See "HTML 4.01 Specification, W3C Recommendation 24 Dec. 1999", which is available on the Internet at location http://www.w3.org/TR/REC-html40, for more information on the TABINDEX attribute.)

Note that while the present invention is discussed in terms of documents encoded in HTML, this is for purposes of illustration and not of limitation. Other markup languages may be used alternatively, if they support TABINDEX or an equivalent.

When a portal is called to render a portal page for a user, the portal calls an internal subsystem that builds the desired page by calling each component which is referenced from the input markup document. These components are typically JavaServer Pages™ ("JSPs") and portlets. ("JavaServer Pages" and "JSP" are trademarks of Sun Microsystems, Inc.) JSPs are commonly used for providing navigation areas for a portal page, and for generating portlet content. Each navigation area JSP and each portlet implemented as a JSP responds to its invocation by executing the JSP code, and generating markup output that it then returns to its invoker. This process of calling each navigation JSP and portlet is called the aggregation process, and the subsystem which performs it is called the aggregator.

As part of the aggregation process, the aggregator builds a composite markup document that represents the portal page, and each navigation area and portlet contribute their markup as part of the aggregated markup stream that comprises the composite markup document. Typically, the composite document is comprised of several nested tables (when using HTML for portal pages). Some portals use nested frames. The WebSphere Portal Server, which may be used for preferred embodiments, uses a table-based approach for constructing HTML portal pages.

The present invention programmatically and dynamically generates TABINDEX attribute values within this composite markup document. According to preferred embodiments, this programmatic generation occurs as an integral part of the aggregation process. In this manner, system overhead is minimized, as no additional pre-processing or post-processing of markup documents is required.

In a first preferred embodiment, JSPs are used as the rendering mechanism whereby the dynamically generated TABINDEX values are inserted into markup documents. In a second preferred embodiment, markup language documents are rendered using a style sheet processor, and a style sheet specifies the insertion of the dynamically generated TABINDEX values. These two embodiments will be described in detail herein, but an overview of the processing of each embodiment will first be described with reference to FIGS. 2A and 2B.

Figure 2A:
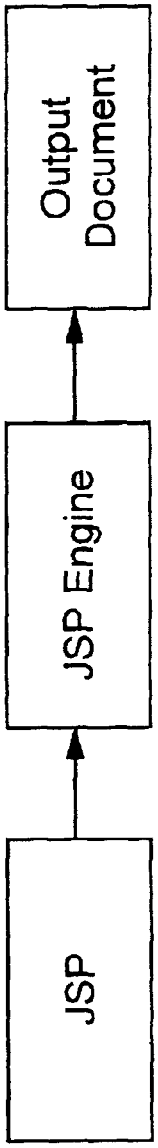
FIGS. 2A and 2B depict an overview of operations of two preferred embodiments of the present invention.

As shown in FIG. 2A, the process 200 of the first preferred embodiment uses a JSP as input to a JSP engine. JSP engine implementations are known in the art and are commercially available. According to the first preferred embodiment, the output of the JSP engine is an output document in which TABINDEX values have been programmatically inserted. The markup stream in this output document is then aggregated with other markup streams by the aggregator during the aggregation process.

Figure 2B:
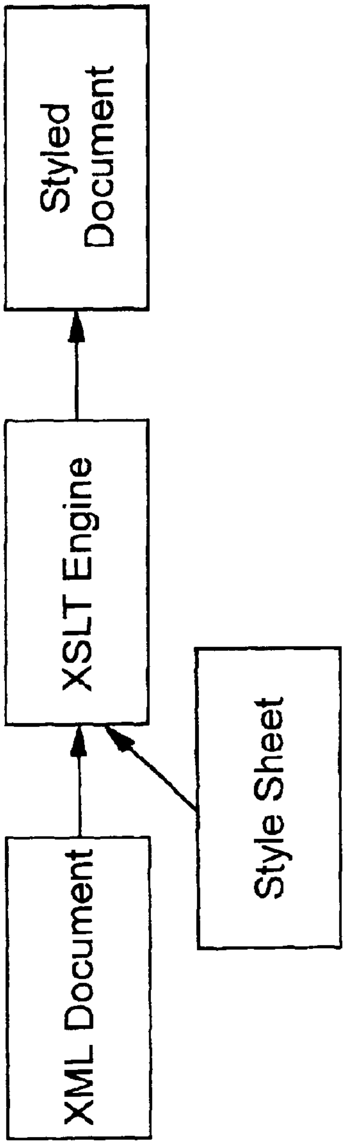

The process 250 shown in FIG. 2B for the second preferred embodiment uses a structured language markup document as input. This preferred embodiment will be discussed hereinafter with reference to input documents encoded in the Extensible Markup Language ("XML") notation, although other similar markup languages (such as the Wireless Markup Language, or "WML", etc.) may be used as well, without deviating from the scope of the present invention. An XML input document is processed by a style sheet processor, which operates according to template rules (also referred to as matching rules) in a style sheet. This process creates a styled document as output, where (according to the second preferred embodiment) the styled document has TABINDEX values programmatically inserted. The style sheet processor will be referred to hereinafter as an Extensible Stylesheet Language Transformation, or "XSLT", processor or engine. Implementations of XSLT engines are known in the art and are commercially available. (Other types of similar style sheet processors may be used alternatively, without deviating from the scope of the present invention.) As in FIG. 2A, the markup stream in the styled output document of FIG. 2B is then aggregated with other markup streams by the aggregator during the aggregation process.

First Preferred Embodiment

The first preferred embodiment will now be described in more detail with reference to FIGS. 5A–5G. JSPs of the prior art may embed "custom tags" in their markup, where these custom tags perform specific functions. These custom tags are a type of processing directive, and may be specified as tab attribute values or as proper tags. (Use of the term "directive" implies that the JSP processing engine is being directed to perform a specific task.) As the JSP engine processes the JSP, the processing called for by the embedded custom tags is performed. The use of the custom tag technology of JSPs is specified with the "taglib" statement, an example of which is shown at reference number 502 of FIG. 5A. This taglib statement is a JSP directive that is used to inform the JSP processing engine where to find the custom tag library (using the "uri" attribute from the taglib statement) and what prefix is used within this particular markup language document to denote custom tags. The value of the "prefix" attribute (see reference number 503) in this example indicates that "ps" is the prefix used in document 500. (For more information on custom JSP tags, refer to the description titled "JavaServer Pages™ Tag Libraries" at http://java.sun.com/products/jsp/taglibraries.html or "Taglib Directive" at http://java.sun.com/products/jsp/tags/syntaxref.fm8.html.)

Figure 3A:
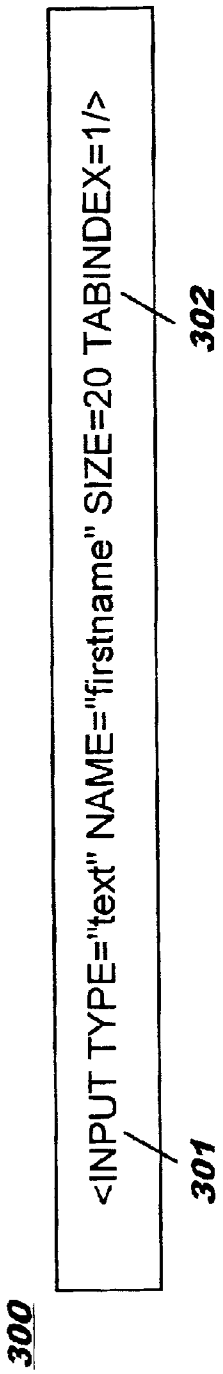
Figure 3B:
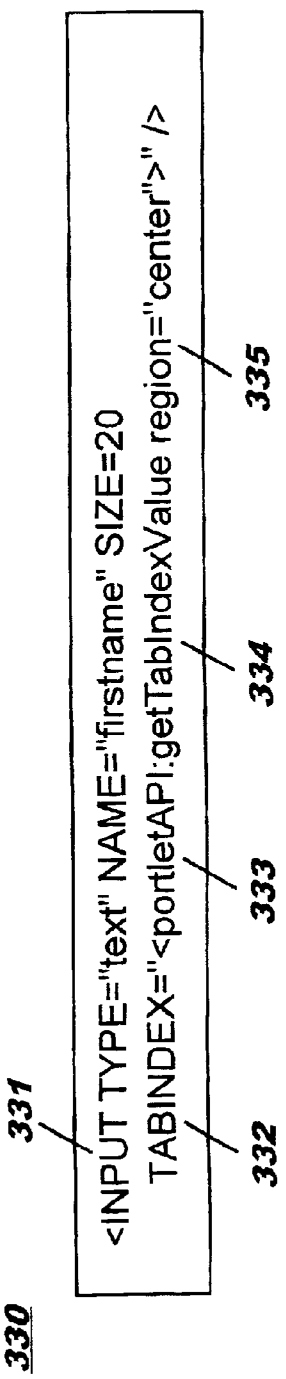

In this first preferred embodiment, the output of the JSPs is a markup stream encoded in HTML, as specified by the processing directive at reference number 501. In this HTML stream, the TABINDEX attribute may be specified as an attribute of any tab-able element. The attribute value then controls the visitation order of this element when it is rendered. An example of the syntax that may be used for this purpose will now be described with reference to FIGS. 3A and 3B. (An optional feature which may be used is then described with reference to FIG. 3C). The example 300 illustrated in FIG. 3A is an INPUT tag (see 301), which accepts textual input for a "firstname" value. The TABINDEX attribute to be used when rendering this tag is set to 1 (see reference number 302), using a prior art static attribute value specification. The syntax 330 used in FIG. 3B provides for dynamically setting the value of the TABINDEX attribute, according to preferred embodiments of the present invention. The example syntax 330 also uses an INPUT tag (see reference number 331). Here, the TABINDEX attribute 332 is specified using a custom tag, which for purposes of illustration uses a namespace prefix of "portletAPI" 333 and the syntax "getTabIndexValue" for the custom tag which, when processed by the JSP engine, will invoke executable code to generate an index value and return markup which incorporates that value. The syntax 330 further comprises a region attribute 335, used by preferred embodiments to tell the index computation process which region of the portal page this element will be rendered in. The value of the region attribute has been specified as "center" for this example, meaning that the content will be rendered in the center of the portal page. (Many alternative syntax forms could be used for specifying the values of the region attribute. For example, the center of the portal page could be indicated by the presence of a "C" value, or perhaps by a numeric identifier. Other examples of the region attribute are discussed below.)

A region value is specified to guide the index computation process in selecting an appropriate TABINDEX attribute value. Knowing the target region enables the computation process to assign numbers in a way that allows the visitation order when using the tab key to flow logically from one navigation area to another navigation area, or into the center of the portal page. (While discussions herein are in terms of using the tab key, they apply also to use of the back tab key for backwards navigation.) According to preferred embodiments, the portal keeps track of previously-assigned tab index values, preferably on a per-region basis, and returns a unique integer value that will be used for the TABINDEX attribute value in the markup stream from which the composite portal page will be rendered.

It may happen that the TABINDEX attribute generated for INPUT element 330 results in markup language syntax which is identical to INPUT element 300, if the index computation process assigns the integer value "1" for the visitation order of the "firstname" field within the "center" region.

When using the TABINDEX syntax shown in FIG. 3B, the index computation process preferably increments a previously-stored counter value to determine the value to be returned on a particular invocation. This approach may be referred to as the "default" ordering approach.

As an alternative to the default ordering approach, an offset value may also be supported for the region attribute specified within a TABINDEX attribute. This is illustrated in the sample syntax 360 of FIG. 3C. (Preferably, use of offsets is not mixed with the default ordering approach within a given region.) The markup example 360 includes three INPUT tags, which may be used for rendering a last name, first name, and an address field, respectively. Suppose it is desirable to override the normal in-order visitation order, and to tab first to the first name, then to the last name, and then to the address. Using the present invention, this visitation order can be specified as shown by the numeric values 2, 1, and 3 (see reference numbers 361, 362, 363). According to this offset ordering approach, the index computation process returns a TABINDEX value using the specified numeric offset value as input. Note that the numeric value is typically altered in the returned syntax, instead of simply returning the offset value. This will now be described further with reference to region-specific tab index range values.

Ranges of tab index values may be assigned to each region. This may be useful as a way of making the assignment of unique tab index values easier and of enabling the tab order layout process to be more intuitive, as will be demonstrated herein; these ranges are also advantageous when coupled with the use of the optional offset values. A properties file or configuration file may be used for specifying a name or similar identifier for each region, along with a chosen starting value and a corresponding ending value for the range. (Alternatively, another type of data structure may be used for this purpose, and other ways of obtaining such values may be substituted if desired, such as by specifying the values directly in an implementation of the index computation process. The configuration or properties file approach, which is referred to hereinafter as using a configuration file for ease of reference, provides a great deal of flexibility and is therefore used in preferred embodiments.) Note that this tab index value range approach may be used with both preferred embodiments.

One example 400 of how region-specific range values may be specified in a configuration file is illustrated in FIG. 4A. As shown therein, the regions are named "north", "south", "center", "west", and "east", and a range of values is specified for each of these regions. The index computation process then uses these values when computing the numeric value to be returned as the TABINDEX attribute value. For example, the first tab index value to be assigned within the north region is 100, and the next would be 101. For the same portal page, the first tab index value to be assigned within the south region is 200. As stated earlier, the visitation order for tab stops begins at the lowest integer value and proceeds incrementally, to each successive next lowest value (i.e. the lowest of the remaining specified values). Thus, a region-to-region order of tab stops is prescribed by the range values specified in FIG. 4A, where this order will cause the regions to be visited in the sequence order in which the regions are listed in the figure. The tab stops within each region will be visited sequentially according to values which will be computed by incrementing a current offset counter which is based initially on the starting offset. (Ending range values are not strictly required, but may be used to ensure that one region's computed index values do not cross over into the range assigned to another region, as will be demonstrated below with reference to FIG. 12.)

FIG. 4B shows a second example 450 of how the ranges may be specified. This example illustrates that the names used for the regions, as well as the values used for the ranges, may vary from one implementation to another (and from one configuration file to another within a single implementation). The number of regions in a configuration file may also vary, although this has not been illustrated in FIG. 4B. In this example, the portal page has presumably been laid out as having "top" and "bottom" navigation areas, and content areas denoted as "user", "corporate", and "local". Because of the manner in which the range values have been assigned in this example, the tabbing order between regions is the sequence order in which they are listed in FIG. 4B. (It is not required that the entries in the configuration file be specified such that the range values are in ascending order.)

The tab ordering within the center area of the portal page, where portlet content is typically rendered, may be performed according to a priority ranking of the various portlets' content. Assuming that the user, local, and corporate regions all provide portlet output, the example in FIG. 4B thus gives priority to the portlet generating content for the user region, with next-highest priority for the local region, and lowest priority for the corporate region.

It is contemplated that a person such as a portal administrator will choose the numbers used for the region range values. Alternatively, individual users might be allowed to choose user-specific range values (e.g. through a user customization interface with which the user may also select the portlets from which content will appear on the portal page and where the output of those portlets is placed). If the center content area is structured such that each portlet has its own region name (and corresponding values), providing the user with this type of customization control enables the user to select the tab order of the portlets within the center content area.

Returning now to the discussion of FIG. 5A, the document 500 encoded therein is a JSP that is used to create a markup stream that will be used for rendering the top navigation area 710 of the portal page illustrated at reference number 700 in FIG. 7A. Portal page 700 will be discussed with reference to the input documents (in FIGS. 5A–5F) and output document (in FIG. 5G) which have been used to create its content. The JSP syntax in document 500 specifies a graphic image (see reference number 504) and two input fields, which are captioned "Userid" and "Password", respectively (see reference numbers 505, 510). Each of these input fields specifies the TABINDEX attribute (see reference numbers 506, 511) and uses the custom tag syntax (see reference numbers 507, 512) to specie that the "getTabIndex" logic should be invoked, passing a region name of "top" and an offset value of "1" (see reference number 508) for the first invocation and an offset value of "2" for the second invocation (see reference number 513). Presumably, "getTabIndex" refers to logic which embodies the index computation process described herein. (This logic is discussed in more detail below with reference to FIG. 12.)

Assuming that the starting range value for the "top" region is 1000, the markup stream generated as a result of the custom tag processing at reference numbers 505, 510 is as shown at 581, 583 of FIG. 5G1, where the dynamically generated TABINDEX values are shown as 1001 and 1002 (see reference numbers 582, 584).

Figure 7:
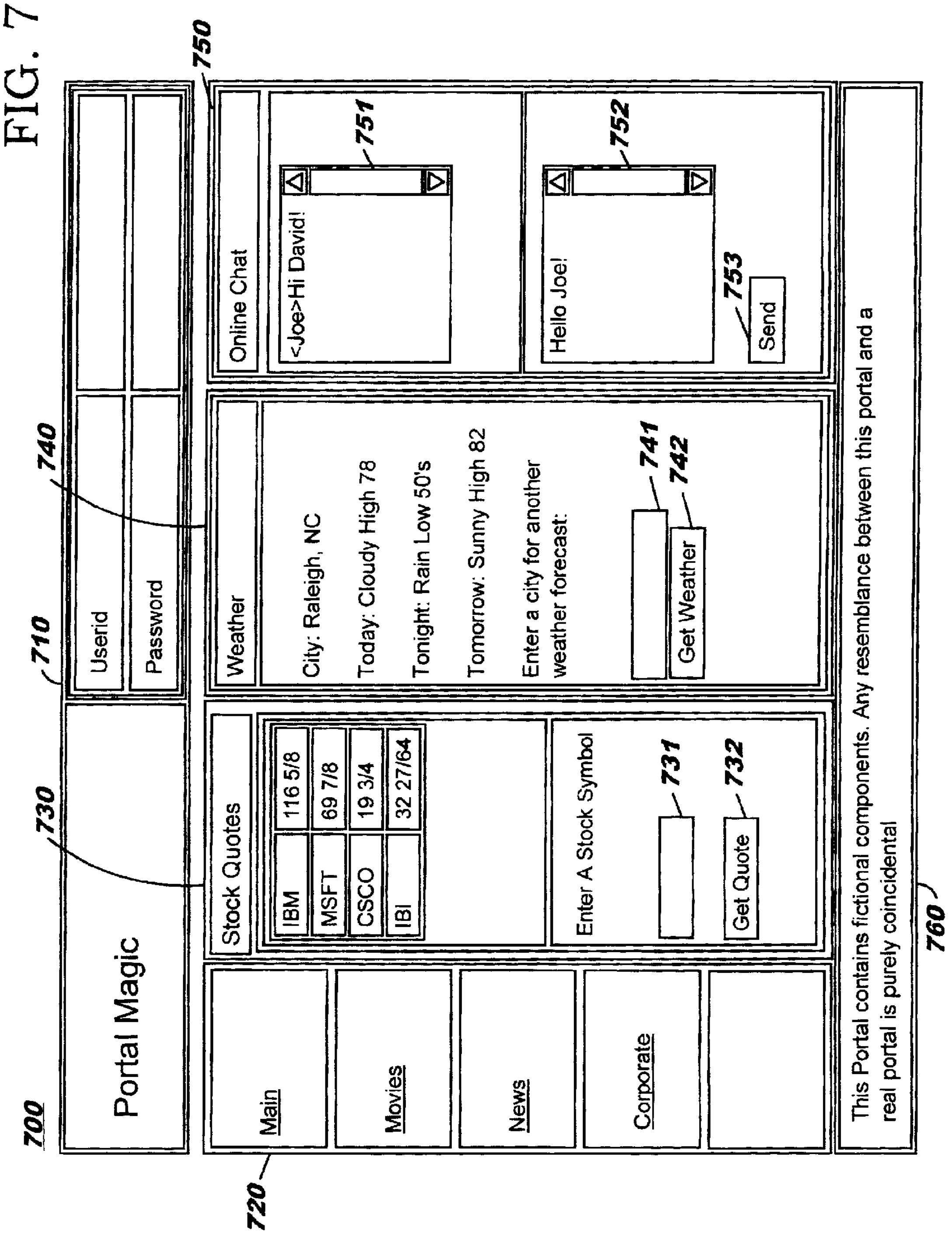
FIG. 7 shows the output portal page generated from the sample output document in FIG. 5G.

FIG. 5B illustrates a JSP 520 that may be used to create a markup stream from which the left navigation area 720 of the portal page 700 of FIG. 7 will be rendered. This JSP 520 also specifies the custom tag processing directive, and contains a table 522 having five rows 523, 527, 528, 529, 530. The fifth row 530 is empty. Each of the other four rows 523, 527, 528, 529 has an anchor tag (which uses the abbreviated syntax "<A . . . >"), and each of these anchor tags has a TABINDEX attribute. See, for example, anchor tag 524 and its TABINDEX attribute value 525. The getTabIndex logic is invoked by the custom tag processing, as was described above with reference to FIG. 5A, to compute the TABINDEX attribute value. In this JSP 520, the value passed to the getTabIndex logic for the region name is "left", and offsets have not been used. (See reference number 526, for example.) Thus, the default ordering approach will be used for computing tab index values in this "left" region.

If the starting range value for the "left" region is 200, the markup stream generated as a result of the custom tag processing for the anchor tags in rows 523, 527, 528, 529 is as shown at 585, 586, 587, 588 of FIG. 5G2, where the dynamically generated TABINDEX values are shown as 201–204.

Referring now to FIG. 5C (comprising FIGS. 5C1 and 5C2). a JSP 540 is provided that may be used to create a markup stream for rendering the "Stock Quotes" content area 730 of the portal page 700 of FIG. 7. As with JSPs 500 and 520, this JSP 540 also specifies the custom tag processing dierective. The content to be rendered as the output of the stock portlet for content area 730 is structured as a table. The table has two input areas, namely an entry field and a "Get Quote" button. These input areas we rendered as field 731 and button 732 of FIG. 7. The input tags 541, 542 each invoke the getTabtudex logic to dynamically generate a TABINDEX attribute value, passing as input values a region name of "StockPortlet" and offsets of "1" and "2".

If the starting range value for the "StockPortlet" region is 50, the markup stream generated as a result of the custom tag processing for the input tags 541, 542 is as shown at 589, 590 of FIG. 5G4, where the dynamically generated TABINDEX values are 51 and 52.

FIG. 5D illustrates a JSP 550 that may be used to create a markup stream for rendering the "Weather" content area 740 of the portal page 700 of FIG. 7. JSP 550 specifies the custom tag processing directive (see reference number 551). The content to be rendered as the output of the weather portlet for content area 740 is structured as a table. The table has two input areas, which are an entry field and a "Get Weather" button. These input areas are rendered as field 741 and button 742 of FIG. 7. The input tags 552, 553 each invoke the getTabIndex logic to dynamically generate a TABINDEX attribute value, passing as input values a region name of "WeatherPortlet" and offsets of "1" and "2".

If the starting range value for the "WeatherPortlet" region is 100, the markup stream generated as a result of the custom tag processing for the input tags 552, 553 is as shown at 591, 592 of FIG. 5G4, where the dynamically generated TABINDEX values are 101 and 102.

FIG. 5E illustrates a JSP 560 that may be used to create a markup stream for rendering the "Online Chat" content area 750 of the portal page 700 of FIG. 7. JSP 560 also specifies the custom tag processing directive. The content to be rendered as the output of the online chat portlet for content area 750 is structured as a table. The table has two "textarea" tags 561, 562, which correspond to chat areas 751, 752 of FIG. 7. The table also has an input tag 563, which corresponds to the Send button 753 of FIG. 7. The getTabIndex logic is invoked by the custom tag processing to compute the TABINDEX attribute value for each of these two textarea tags and the input tag. In this JSP 560, the value passed to the getTabIndex logic for the region name is "ChatPortlet", and offsets have not been used. (See reference number 564, for example.)

If the starting range value for the "ChatPortlet" region is 150, the markup stream generated as a result of the custom tag processing for the textarea tags 561, 562 is as shown at 593, 594 and the input tag 563 markup is shown at 595 of FIG. 5G5, where the dynamically generated TABINDEX values are 151, 152, and 153.

Finally, FIG. 5F illustrates a JSP 570 that may be used to create a markup stream for rendering the bottom navigation area 760 of the portal page 700 of FIG. 7. As with the other JSPs, JSP 570 specifies the custom tag processing directive. The JSP syntax in document 570 specifies a graphic image (see reference number 572), and in this example does not contain any tab-able elements. Thus, no TABINDEX attributes appear. The content to be rendered for navigation area 760 is also structured as a table (see reference number 571 of FIG. 5F), and the rendered result of processing this table is shown at 760 of FIG. 7.

Figure 8:
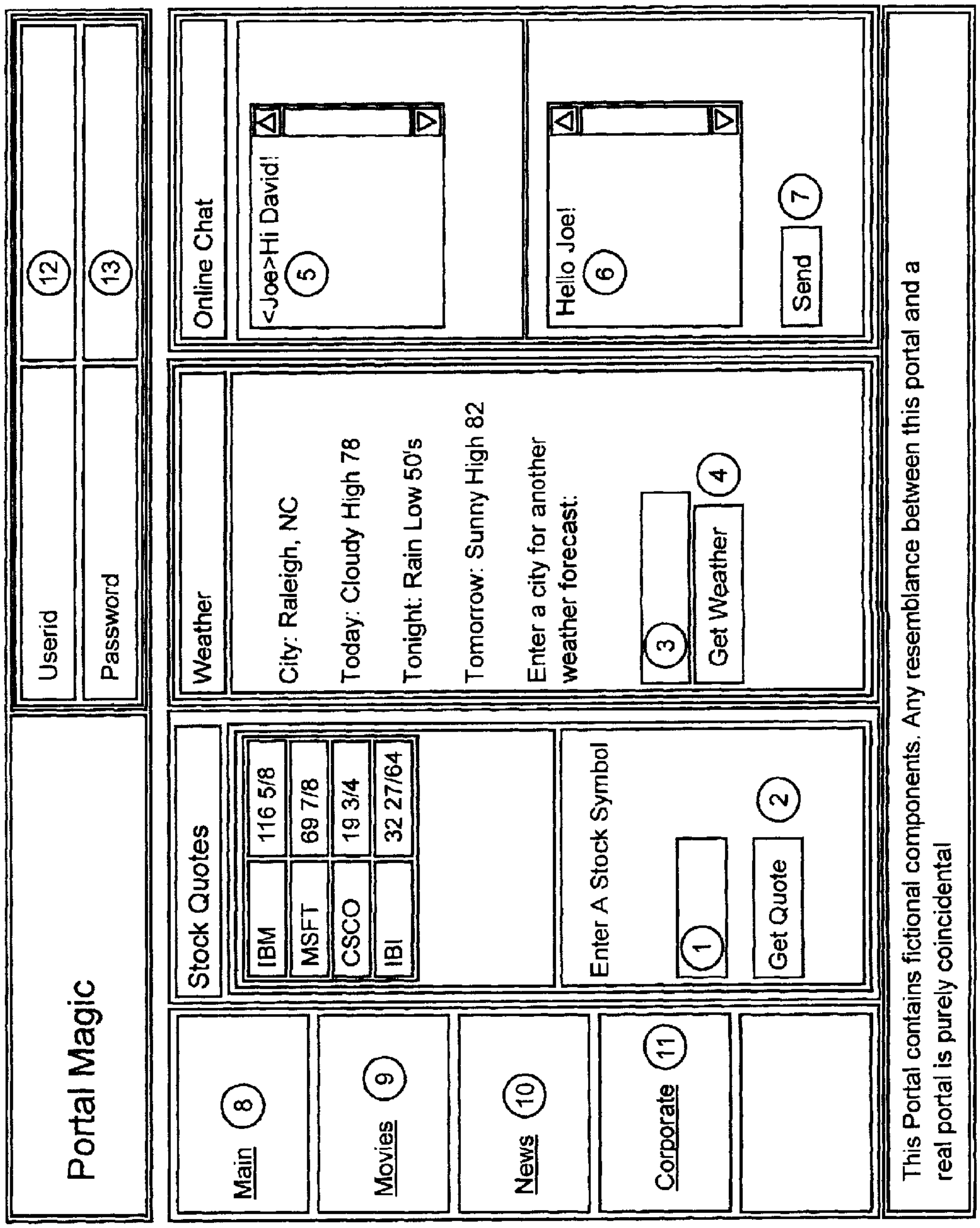
FIG. 8 shows the output portal page of FIG. 7, with annotations showing where the tab stops occur during actual page navigation when using the techniques of the present invention.

FIG. 8 shows the sante portal page 700 as FIG. 7, but has been annotated to show the order of tab stops, as specified by the TABINDEX attribute values in the output document 580 of FIG. 5G. Thirteen tab stops are provided in this rendered portal page, and encircled numbers 1 through 13 correspond to the order in which these tab stops will be visited when the tab key is pressed repeatedly. Note that priority for visitation has been given to the content area in the center of the page, where the first tab stop (shown by an encircled number 1) appears in the entry field of the Stock Quotes portlet's output area. After tabbing through the two tab-able fields of this portlet, the next tab stop is in the Weather portlet output area, and tabbing out of the Weather portlet moves the focus Into the Online Chat portlet. The left navigation area (indicated by reference number 720 in FIG. 7) has the next-highest priority for navigation, and will be visited after tabbing out of the Online Chat portlet. The top navigation area (indicated by reference number 710 in FIG. 7) has the lowest priority for navigation, having the 12th and 13th tab stops. While the sequence illustrated in this example does not flow in-order through the portal page, it likely represents the order in which a user would be most interested in navigating the page. (That is, the user is most likely to be interested in visiting the portlet content areas, and least interested in returning to the input fields where he or she enters his/her user identifier and password.) Thus, it can be seen that use of the present invention allows coordinating the output of multiple JSPs, providing a visitation order that is more intuitive and is better adapted to the particular page being rendered.

Second Preferred Embodiment

In a second preferred embodiment, the tab index numbering may be introduced into a markup stream by an XSLT engine, as was briefly described above with reference to FIG. 2B. In this embodiment, an XSL style sheet specifies the invocation of the logic with which the index values are computed. Suppose the input document for which TABINDEX values need to be generated is the input document 600 of FIG. 6A. This document is encoded in XML, and contains information about the performance of three different stock symbols, where this information may have been obtained (for example) by invoking a Web-based stock performance service. It might be desirable to make a "My stock performance" region of the portal page one of the higher-priority tab stops, even though the output of the corresponding stock-performance portlet might not be rendered in the first-reachable region of the portal page. The techniques of this second preferred embodiment enable this priority-based visitation order to be provided.

A style sheet can be used to insert TABINDEX attribute values into the stock performance markup syntax programmatically and dynamically, according to the techniques of this second preferred embodiment. FIG. 6B (comprising FIGS. 6B1 and 6B2) shows an example of a style sheet 630 that may be used for this purpose. The prefix "ps" is used therein to denote elements which are provided as style sheet extensions. (See the syntax at reference number 635, which specifies this prefix.) The style sheet 630 takes an XML input document and converts it to an HTML output document. (See the syntax at reference number 636.) When applied to input document 600, the matching rules in the style sheet produce the output document 660 of FIG. 6C (comprising FIGS. 6C1 and 6C2).

The transformation between input document 600 and output document 660, as prescribed by style sheet 630, will now be described in more detail.

A first rule 640 from style sheet 630 specifies that, upon matching the "<market-data>" tag 605 from the input document 600, a table having six columns ("Symbol", "Last Trade", "Change", "Volume", "Open", and "Day's Range") is to be generated. (See reference number 645.) The corresponding table markup in the output document begins at reference number 665 of FIG. 6C, and the table columns are specified by the markup at reference number 670. The first rule 640 also specifies that a form is to be generated in the output document, where each of the two input fields in this form is to have a TABINDEX attribute value that is computed as the first and second offset in the "StockPortlet" region. (See the getTabIndex invocations at 651 and 652 of the <form> element 650.) When this form element 650 is processed by an XSLT engine, it will invoke the getTabIndex computation logic, passing the region name and offset values as input. The markup output which results from the XSLT processing is shown at reference number 680 of FIG. 6C, with the generated TABINDEX attribute values of 101 and 102 shown at reference numbers 681, 682. (It may be presumed that a starting range value of 100 was used when generating these values of 101 and 102.)

The rule 655 of style sheet 630 specifies how each "<quote>" or "<quote-set>" tag from the input document 600 is to be transformed by the XSLT engine. This processing occurs as in the prior art, and is included for illustrative purposes. (As can be seen by inspection, nine of the values are extracted from the stock performance data for each stock symbol, and markup syntax is generated for each extracted value that will render the nine values as a row in the table represented by output document 660. The markup for the first such row is denoted by reference number 675.)

Figure 6D:
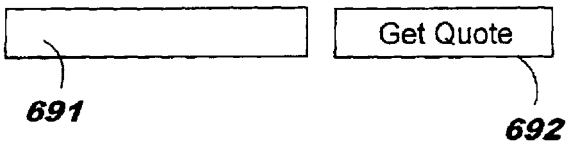
FIG. 6D shows the output portal page generated from aggregating these sample input documents, according to a second preferred embodiment of the present invention.

FIG. 6D shows a table 690 that is rendered from the output document 660 of FIG. 6C. If a user interacts with this rendered table through a browser or other user agent, the first tab stop (as specified by index setting 101 in FIG. 6C) will be at the point designated by reference number 691, which is the left-most portion of an entry field. The next tab stop will be at the "Get Quote" button, as indicated by reference number 692. If this table is rendered with other content on a portal page, pressing the tab key again will move the focus to the element having an attribute value that is higher than 102 (or to the next-occurring tab-able element, if no higher attribute values are specified).

Style sheet extensions of the type on which this second preferred embodiment is based may be implemented by modifying the XSLT engine. The getTabIndex function may be provided using one version which supports the default ordering approach (and has a single parameter) and another (overloaded) version which supports the offset ordering approach (and has two input parameters). Alternatively, the default ordering approach might by supported by a version which expects two input parameters, in which case the calls to this logic may use a technique such as specifying a negative value for the second parameter as a signal that the default ordering approach should be used for this invocation. The getTabIndex logic is preferably implemented as a method in the Java™ programming language for this preferred embodiment; a Java method is also preferably used for the getTabIndex logic described with reference to the first preferred embodiment. ("Java" is a trademark of Sun Microsystems, Inc.)

Note that the portal page 700 of FIG. 7 might have alternatively been generated using the approach of this second preferred embodiment.

Turning now to the flowcharts in FIGS. 9–12, logic will be described which may be used to implement preferred embodiments of the present invention.

Figure 9:
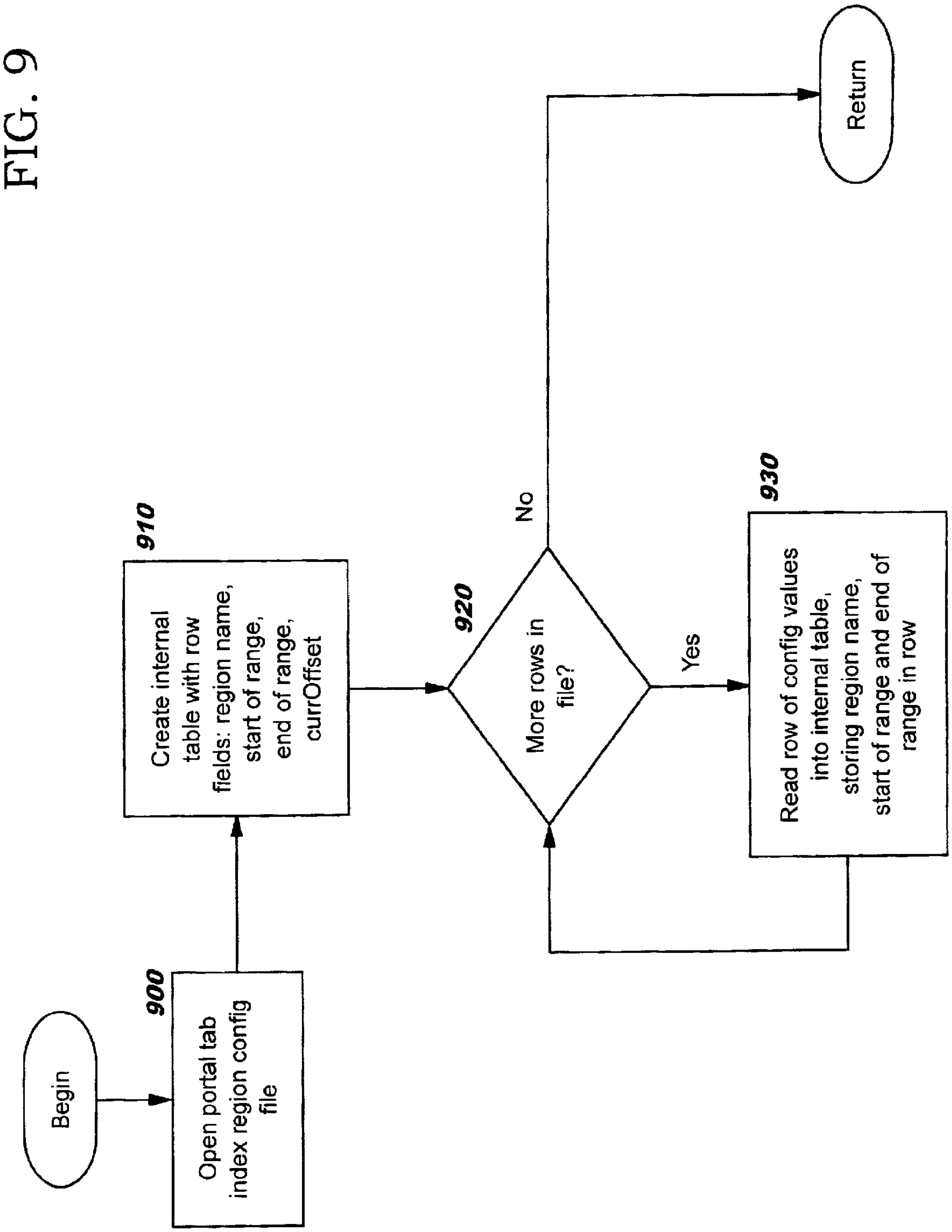
FIGS. 9–12 provide flowcharts illustrating logic that may be used to implement preferred embodiments of the present invention.

The processing of FIG. 9 may be used to set up an internally-accessible representation of the value ranges which may be used by either of the embodiments (as has been described above). Preferably, this logic operates when the portal is initialized. Starting at Block 900, the configuration file (or other data repository) is opened. The portal tab index region information was previously stored in this configuration file, for example using input from a portal administrator or user, as discussed earlier. Block 920 creates an internal data Structure, referred to in FIG. 9 as a table (by way of illustration). This internal table preferably has a row for each region, and each row preferably contains fields for the region name, the starting range value for that region, the ending range value, and a current offset value. Each of these latter three (i.e., numeric) fields is preferably initialized to zero.

Block 920 begins an iterative loop which stores values from the configuration file into the internal tab index table. Block 920 checks to see if there are more (as-yet-unprocessed) rows in the configuration file. When this test has a positive result, processing continues at Block 930, which reads a row from the configuration file and uses the values contained therein to set the region name, starting range value, and ending range values in a row of the internal table. (Note that the current offset value remains set to its initial value. This value is subsequently incremented as the index computation logic assigns tab index values within the regions.) When all of the rows from the configuration file have been processed, the test in Block 920 has a negative result, and the processing of FIG. 9 ends.

Figure 10:
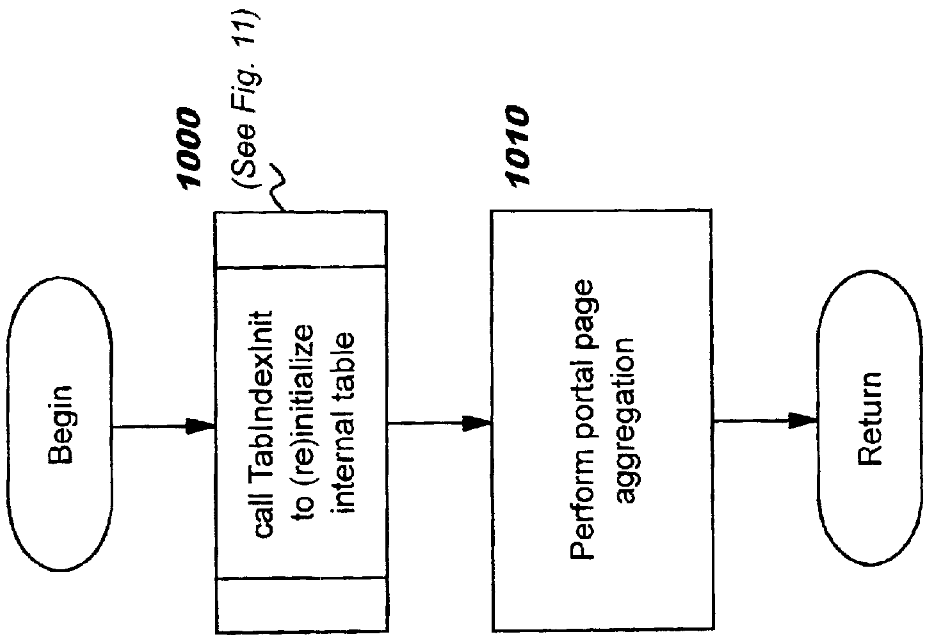
Figure 11:
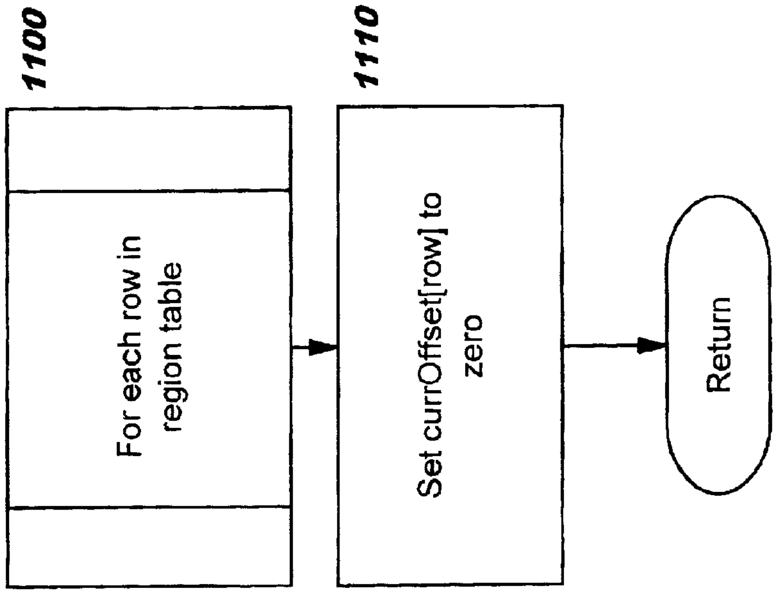

The logic in FIGS. 10 and 11 may be used to re-initialize the internal tab index table, and may be used by either of the embodiments which has been described above. This logic is preferably executed whenever the portal begins an aggregation process to create a portal page. As shown by Block 1000, a routine referred to as "TabIndexInit" is called to re-initialize the internal table. Logic which may be used to implement this TabIndexInit routine is shown in FIG. 11. Referring now to FIG. 11, Blocks 1100 and 1110 indicate that the re-initialization processing for each of the rows in the internal table comprises setting the current offset value in the row to its initial value (which, as stated above, is preferably zero). This enables the aggregation process to assign tab index values for each portal page anew as the TABINDEX attributes in the input markup streams are encountered. Returning again to FIG. 10, after the current offset values in the internal table have been reinitialized by the processing of FIG. 11, the markup streams having the dynamically-generated TABINDEX attribute values are used as input to the aggregation process (Block 1010). The processing of FIGS. 10 and 11 is then complete. The aggregated stream is then typically processed by a rendering agent to create the rendered portal page.

Figure 12:
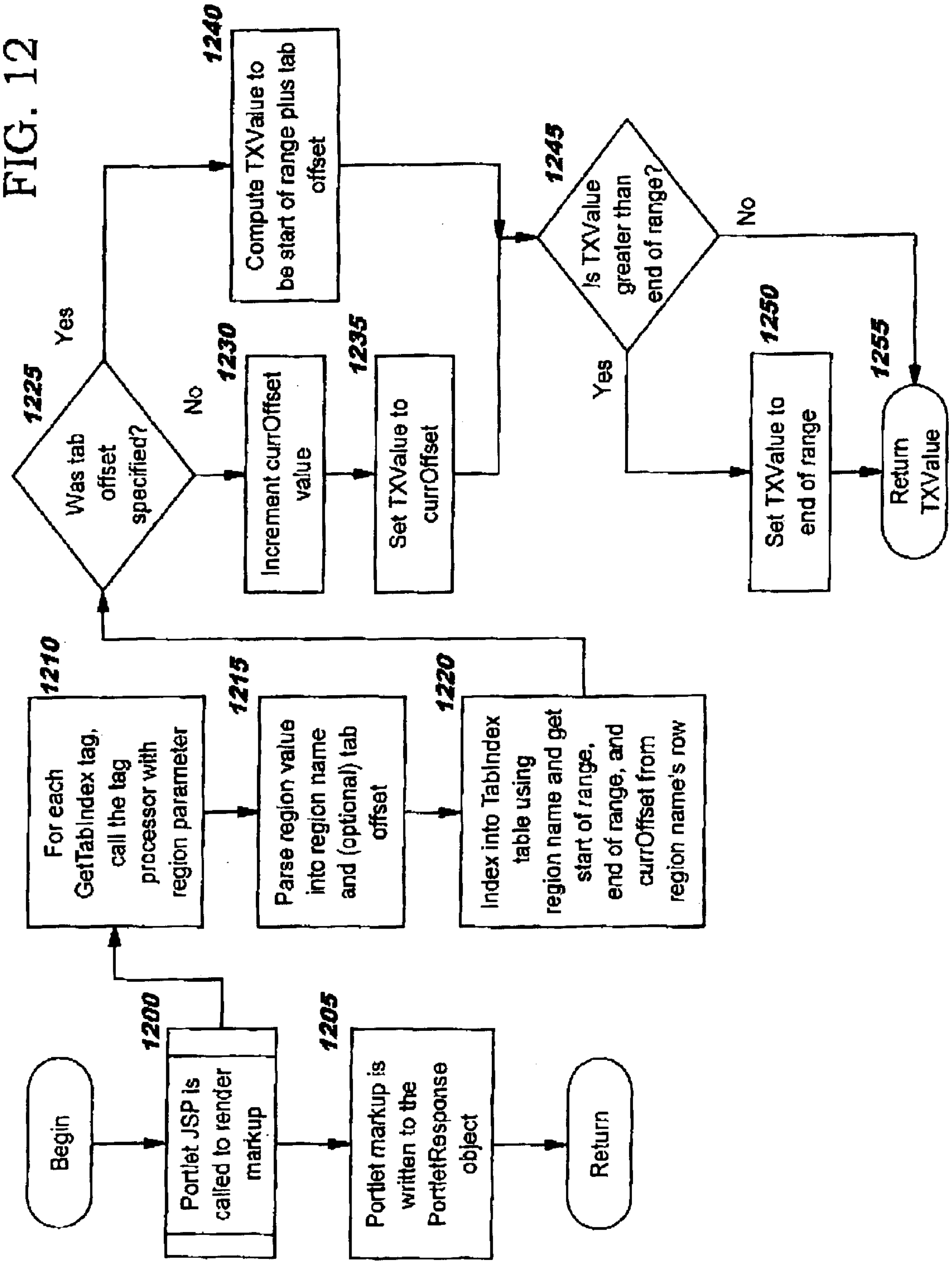

FIG. 12 depicts logic that may be used to implement the JSP-based first preferred embodiment. The logic in Blocks 1210–1255 corresponds to the getTabIndex function which has been discussed above with reference to the TABINDEX custom tag syntax. The logic in Blocks 1210–1255 may also be used with the style sheet-based second preferred embodiment. (As shown, FIG. 12 corresponds to the processing flow in FIG. 2A.)

Block 1200 of FIG. 12 indicates that the portlet JSP (or, alternatively, a JSP used to create a navigation area or other type of area) is called to render a markup stream. The generated portlet markup is then written to a portlet response object (Block 1205), which is referred to in FIG. 12 as the "PortletResponse" object. (This object is subsequently processed by the content aggregator when creating a composite markup stream that is to be rendered as the portal page.)

The logic in Blocks 1210–1255 will now be described. As shown in Block 1210, the index computation process is called for each GetTabIndex tag located in the input document which is being processed. The region parameter from the tag is passed as input in this process, including the region name and the optional offset value. Block 1215 parses this region parameter, identifying the region name and the offset, if specified.

Block 1220 indexes into the internal tab index table, using the region name as a key. The starting, ending, and current offset values are retrieved. Block 1225 checks to see if an offset value was specified on the getTabIndex tag which is being processed. If not, then control transfers to Block 1230 where the value for a variable referred to in FIG. 12 as "currOffsef" (i.e. the current offset for this region) is incremented. Block 1235 then sets a variable "TXValue" to this incremented value. (Note that the ordering of Blocks 1230 and 1235 results in the starting range value not being used. Thus, as in the discussions above, the first assigned value within a range such as 200–300 is 201. If it is desirable to use the initial value within each range, the ordering of Blocks 1230 and 1235 can be reversed.) Processing then continues at Block 1245.

When the test in Block 1225 has a positive result, indicating that an offset value was specified in the input document, control transfers to Block 1240. Block 1240 computes the value of the TXValue variable as the sum of the starting range value for this region and the offset value which was specified in the input document. Processing then continues at Block 1245.

Block 1245 tests to see if the value of variable TXValue is greater than the ending range value for this region. If so, then Block 1250 resets the TXValue variable to the ending range value. (This may result in duplicated TABINDEX attribute values. The tab-able elements having these duplicate values are then visited in the order in which the elements are specified in the rendered document, as has been discussed earlier.) When the test in Block 1245 has a negative result, and also following the processing of Block 1250, the value of variable TXValue is returned (Block 1255). This value will be inserted into the markup language which is returned as the output of the processing of FIG. 12.

As has been demonstrated, the present invention provides improved navigation of content that has been rendered in a content aggregation framework, such as the content in a rendered portal page. The navigation order for the aggregated content is set dynamically, using programmatic operations. The navigation order may therefore be efficiently controlled, even though the content which is aggregated may originate from multiple independent sources.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While the preferred embodiments of the present invention have been described, additional variations and modifications in those embodiments may occur to those skilled in the art once they learn of die basic inventive concepts. For example, other types of scripting language documents (such as documents encoded using javascript) may be substituted for JSPs, if the substituted scripting language provides features of the type discussed herein. Therefore, it is intended that the opened claims shall be constued to include both the preferred embodiments and all such variations and modifications as fall within the spirit and scope of the invention.

What is claimed is:

1. A method of improving navigation of content in a user interface that has been rendered in a content aggregation framework, comprising steps of:

detecting, on a navigable element of an input document encoded in a markup language, an indication that a navigation stop should occur at this clement in a determined navigation order when the element is subsequently rendered;

programmatically determining, responsive to detecting the indication, the navigation order in which the navigation stop at the element should occur; and programmatically modifying the navigable element from the input document to specify the programmatically determined navigation order.

2. The method according to claim 1, wherein the detecting, programmatically determining, and programmatically modifying steps operate on indications of more than one navigable element in the input document.

3. The method according to claim 2, further comprising the step of rendering an output document which results from the programmatically modifying step, wherein the programmatically-modified element rendered in the rendered output document is navigable in its programmatically determined navigation order.

4. The method according to claim 2, further comprising the step of aggregating a plurality of input documents encoded in the markup language, thereby creating an aggregated document, wherein more than one of the input documents specifies navigation stops on navigable elements, and wherein the programmatically determining and programmatically modifying steps are performed for each of the input documents during the aggregating step.

5. The method according to claim 4, further comprising the step of rendering the aggregated document, wherein the programmatically-modified elements rendered in the rendered aggregated document are navigable in their programmatically determined navigation order.

6. The method according to claim 1, wherein the markup language is HTML ("Hypertext Markup Language").

7. The method according to claim 4, wherein the markup language is XML ("Extensible Markup Language").

8. The method according to claim 1, wherein the input document is a JavaServer Page specification.

9. The method according to claim 8, wherein the programmatically modifying step modifies a document created by programmatically evaluating the JavaServer Page specification.

10. The method according to claim 1, wherein the input document is a markup stream created by a portlet.

11. The method according to claim 10, wherein the programmatically modifying step modifies the markup stream.

12. The method according to claim 1, wherein the programmatically modifying step further comprises evaluating the input document according to a style sheet.

13. The method according to claim 12, wherein the style sheet is encoded in XSL ("Extensible Stylesheet Language").

14. The method according to claim 1, wherein the indication comprises a reference to executable code and supplies an identification of a user interface region into which the navigable element is to be rendered.

15. The method according to claim 14, wherein the indication further comprises an offset valve within the user interface region.

16. The method according to claim 1, wherein the indication is specified as a value of a TABINDEX attribute.

17. The method according to claim 16, wherein the indication comprises a reference to executable code and supplies an identification of a user interface region into which the navigable element is to be rendered, and wherein the programmatically modifying step replaces the reference and region identification with a numeric value that specifics the programmatically determined navigation order.

18. The method according to claim 16, wherein the indication comprises a reference to executable code and supplies an identification of a user interface region into which the navigable element is to be rendered as well as an offset within the user interface region, and wherein the programmatically modifying step replaces the reference, region identification, and offset with a numeric value that specifies the programmatically determined navigation order.

19. A method of dynamically specifying a visitation order for navigable elements in a user interface that has been rendered in a content aggregation framework, comprising steps of:

aggregating a plurality of input documents encoded in a markup language, wherein more than one of the input documents specifies navigation stops on navigable elements;

detecting, on selected ones of one or more navigable elements of the input documents during the aggregation, an indication that a navigation stop should occur at the respective element in a determined navigation order when the selected ones are subsequently rendered;

programmatically determining, responsive to detecting the indication on each selected one, the navigation order in which the navigation stop at the respective element should occur;

programmatically modifying the navigable element on each selected one to specify its programmatically determined navigation order; and rendering an output document which results from the programmatically modifying step, wherein the selected ones of the elements of the rendered output document are navigable in their programmatically determined navigation order.

20. A system for improving navigation of content in a user interface that has been rendered in a content aggregation framework, comprising:

means for detecting, on a navigable element of an input document encoded in a markup language, an indication that a navigation stop should occur at this element in a determined navigation order when the element is subsequentially rendered;

means for programmatically determining, responsive to detecting the indication, the navigation order in which the navigation stop at the element should occur; and means for programmatically modifying the navigable element from the input document to specify the programmatically determined navigation order.

21. The system according to claim 20, further comprising means for aggregating a plurality of input documents encoded in the markup language, thereby creating an aggregated document, wherein more than one of the input document specifies navigation stops on navigable elements, and wherein the means for programmatically determining and the means for programmatically modifying are performed for each of the input documents during operation of the means for aggregating.

22. The system according to claim 21, further comprising means for rendering the aggregated document, wherein the programmatically-modified elements rendered in the rendered aggregated document are navigable in their programmatically determined navigation order.

23. A computer program product for improving navigation of content in a user interface that has been rendered in a content aggregation framework, the computer program product embodied on one or more computer-usable media and comprising:

computer-readable program code means for detecting, on a navigable element of an input document encoded in a markup language, an indication than a navigation stop should occur at this element in a determined navigation order when the element is subsequently rendered;

computer-readable program code means for programmatically determining, responsive to detecting the indication, the navigation order in which the navigation stop at the element should occur; and computer-readable program code means for programmatically modifying the navigable element from the input document to specify the programmatically determined navigation order.

24. The computer program product according to claim 23, further comprising computer-readable program code means for aggregating a plurality of input documents encoded in the makeup language, thereby creating an aggregated document, wherein more than one of the input documents specifies navigation stops on navigable elements, and wherein the computer-readable program code means for programmatically determining and the computer-readable program code means for programmatically modifying are performed For each of the input documents during operation of the computer-readable program code means for aggregating.

25. The computer program product according to claim 24, further comprising computer-readable program code means for rendering the aggregated document, wherein the programmatically-modified elements rendered in the rendered aggregated document are navigable in their programmatically determined navigation order.

* * * * *

UNITED STATES PATENT AND TRADEMARK OFFICE

CERTIFICATE OF CORRECTION

PATENT NO. : 6,918,090 B2

APPLICATION NO. : 10/055472

DATED : July 12, 2005

INVENTOR(S) : Hesmer et al.

It is certified that error appears in the above-identified patent and that said Letters Patent is hereby corrected as shown below:

Column 10, line 53,
Change "5C2). a" to --5C2), a--;

Column 10, line 57,
Change "dierective" to --directive--;

Column 11, line 53,
Change "the sante portal" to --the same portal--;

Column 13, line 65,
Change "data Structure, referred" to --data structure, referred--;

Column 16, line 23,
Change "of die basic" to --of the basic--;

Column 16, line 38,
Change "this clement in" to --this element in--;

Column 18, line 38,
Change "indication than a" to --indication that a--;

Column 18, line 58,
Change "performed For each" to --performed for each --.

Signed and Sealed this

Eighteenth Day of July, 2006

JON W. DUDAS

*Director of the United States Patent and Trademark Office*